United States Patent [11] 3,596,855

| [72] | Inventor | Geoffrey M. Barling<br>London, England |
|---|---|---|
| [21] | Appl. No. | 813,949 |
| [22] | Filed | Apr. 7, 1969 |
| [45] | Patented | Aug. 3, 1971 |
| [73] | Assignee | Elliott Brothers (London) Limited<br>London, England |
| [32] | Priority | Apr. 11, 1968 |
| [33] | | Great Britain |
| [31] | | 17,663/68 |

[54] AIRCRAFT CONTROL SYSTEM
10 Claims, 1 Drawing Fig.

[52] U.S. Cl. .................................................. 244/77
[51] Int. Cl. .................................................. B64c 13/18
[50] Field of Search ............................................ 244/77, 77
A, 77 B, 77 D, 77 G, 77 OV

[56] References Cited
UNITED STATES PATENTS
3,132,828  5/1964  Edinger et al. .................. 244/77

| 3,169,730 | 2/1965 | Gaylor et al. ................. | 244/77 |
| 3,203,652 | 8/1965 | Doniger et al. ............... | 244/77 |
| 3,463,422 | 8/1969 | Watson ....................... | 244/77 |

Primary Examiner—Milton Buchler
Assistant Examiner—James E. Pittenger
Attorney—Wenderoth, Lind and Ponack ABSTRACT: An aircraft control system for enabling the aircraft to capture and follow a predetermined flight path, the system including means giving a displacement error signal which is a measure of the vertical displacement of the aircraft from the flight path, means giving a vertical velocity signal representative of the vertical velocity of the aircraft, a logic circuit for connecting the output of a pitch signal generator to the input of the pitch control channel of the aircraft when the displacement error signal is equal to the vertical velocity signal, and means for ensuring that there is no abrupt change in the pitch demand signal supplied to the pitch channel.

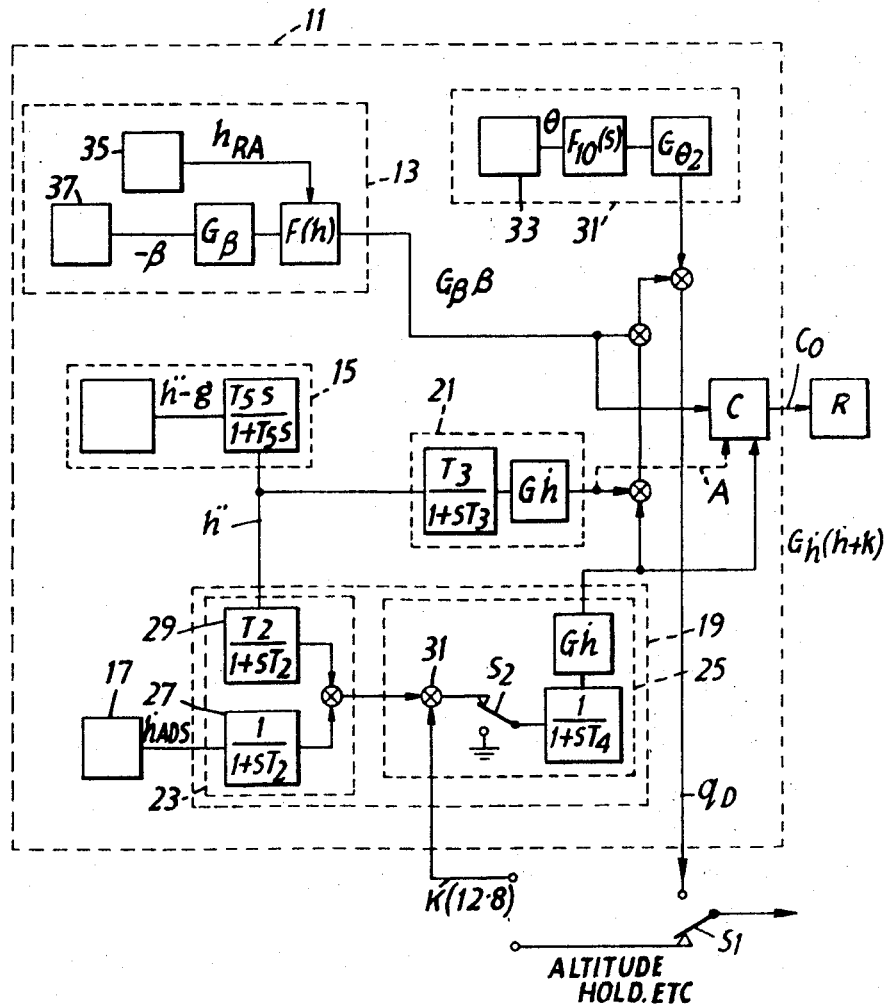

AIRCRAFT CONTROL SYSTEM

The invention relates to aircraft control systems.

According to the invention there is provided an aircraft control system including a pitch signal generator for developing a pitch signal to control the pitch channel of the aircraft, the pitch signal generator comprising: means for deriving a displacement error signal which is a measure of the vertical displacement of the aircraft from a predetermined flight path; means for developing a vertical velocity signal representative of the vertical velocity of the aircraft; a logic circuit to which are applied as inputs the displacement error signal and the vertical velocity signal and which is effective to develop a capture initiation signal when the said signals are equal in magnitude, the capture initiation signal being indicative that the aircraft is at a position at which the output of the pitch signal generator may be connected to the pitch channel of the aircraft so as to cause the aircraft to capture and track the flight path; and means for ensuring that the pitch signal at the output of the pitch signal generator when the capture initiation signal is developed is substantially the same as the signal in the pitch channel.

The logic circuit may be connected by way of a lag filter to the accelerometer so that the position at which the capture initiation signal is developed is influenced by transient motion which the aircraft may be experiencing.

In one embodiment of the invention the said filter circuit comprises a complementary filter, which receives the accelerometer and air data sensor signals, and a first lag filter. When the capture initiation signal is developed the complementary filter is disconnected from the lag filter the input of which is connected to earth, the signal stored in the lag filter being supplied, as an open-loop signal, to the pitch channel. The signal stored in the lag filter at disconnection of the complementary filter is the average of the output signal of the complementary filter over the period of about 5 seconds precedent to disconnection; and, following disconnection of the complementary filter, the signal stored in the lag filter decreases substantially to zero at a rate such that the stored signal makes a significant contribution in ensuring that, from the position determined by the null signal, the aircraft merges substantially smoothly with the flight path.

The output of the accelerometer may be connected to a second lag filter, the lagged accelerometer signal serving as a short period damping term in the pitch signal.

The pitch signal generator means may include means for generating a pitch attitude signal serving as a long period damping term in the pitch signal.

The circuitry may be operative to develop an error signal which is a measure of vertical displacement of the aircraft from the centerline of a glide slope beam; and the signal, indicative of vertical velocity, from the filter circuit is measured with reference to a signal level indicative of a predetermined height rate which is the nominal rate of descent assigned to the aircraft for glide slope tracking.

The sensitivity of the circuit operative to develop the displacement error signal may be varied in accordance with altitude.

A glide slope capture and track system in accordance with the invention is hereinafter described with reference to the accompanying drawing, of which the sole FIGURE is a block diagram of one embodiment of the invention.

The system comprises pitch signal generator means 11, in this embodiment designed to develop a rate signal $q_d$, comprising circuitry 13 operative to develop an error signal $G_{\dot{\beta}}\beta$ which is a measure of vertical displacement of the aircraft with respect to a predetermined flight path, the centerline of a glide slope beam; an accelerometer 15 operative to develop a signal $\ddot{h}$ which is a measure of vertical acceleration of the aircraft; an air data sensor 17 operative to develop a signal $\dot{h}_{ADS}$ which is a measure of vertical velocity of the aircraft; filter circuitry 19 operative to develop, from the accelerometer and air data sensor signals $\ddot{h}$ and $\dot{h}_{ADS}$ respectively, a signal $G_{\dot{h}}(\dot{h}+k)$ which represents vertical velocity of the aircraft, with reference to some predesignated datum $k$ and has a signal-to-noise ratio significantly better than that of the air data sensor 17; and logic circuitry C which receives the filter circuitry and error signals, $G_{\dot{h}}(\dot{h}+k)$ and $G_{\dot{\beta}}\beta$ respectively, and, when these signals are equal develops an output signal $C_o$ which indicates that the aircraft is at a position at which the pitch rate signal generator means 11 may be connected to the pitch channel so as to cause the aircraft to capture and track the centerline of the glide slope beam, and without introducing a step input into the pitch channel.

The logic circuitry C may also receive the output $\ddot{h}$ of the accelerometer 15 by way of a lag filter. For example, a lag filter is shown at 21 which, although used for another purpose in the illustrated embodiment, may alternatively, or in addition, be used as indicated by the broken line A. The filter 21 has an integrating function, so that the position at which the capture initiation signal $C_o$ is developed by the logic circuit C is influenced by transient motion which the aircraft may be experiencing. In the system illustrated, in full line, however, it is assumed that capture initiation takes place from a constant velocity.

The filter circuitry 19, as shown, comprises a complementary filter 23 and a lag filter 25. The complementary filter 23 comprises a lag filter 27 which receives the air data sensor output signal $\dot{h}_{ADS}$, and a filter 29 which receives the accelerometer signal $\ddot{h}$ and develops an output signal indicative of washed out $\dot{h}$, where $\dot{h}$ is the integral of the accelerometer output signal $\ddot{h}$.

The lag filter 25 is connected to one input of the logic circuitry C another input of which receives the vertical beam error signal $G_{\dot{\beta}}\beta$. The lag filter 25 has its input connected to a summing point 31 which receives the signal from the complementary filter 23 and also, as an open-loop input, a signal $k$ representative of a predesignated optimum value of height rate for the particular aircraft involved.

The capture initiation signal $C_o$ developed by the logic circuitry C when the filter circuitry and error signals $G_{\dot{h}}(\dot{h}+k)$ and $G_{\dot{\beta}}\beta$ respectively are equal is effective, through a relay R, to close a contact S, so as to connect the output of the pitch rate signal generator means 11 to the pitch channel and, also, to operate a changeover contact $S_2$ so as to disconnect the input of the lag filter 25 from the output of the complementary filter 23 and connect it to earth.

The time constant of the lag filter 25 prior to its disconnection, that is to say, before glide slope capture is initiated by operation of the contacts $S_1$ and $S_2$ and, the consequent connection of the pitch rate signal generator means 11 to the pitch channel is about 5 seconds. The time constant of the lag filter 25 after the connection of its input to earth is of the order 20 seconds.

As may be seen, after operation of the contacts $S_1$ and $S_2$, the signal stored in filter 25 at connection of its input to earth is supplied as an open-loop signal to the pitch channel of the aircraft. Since the pitch signal generator means 11 is not connected to the pitch channel until parity exists between the vertical beam error signal $G$ and the filter signal $G_{\dot{h}}(\dot{h}+k)$, when engagement of the pitch signal generator means with the pitch channel does occur, there is no stop input introduced into the pitch channel.

In the absence of an open-loop signal from the filter 25 the course of the aircraft, subsequent to capture initiation would be determined primarily by the vertical error signal $G_{\dot{\beta}}\beta$ and the aircraft, in nulling this signal, would intersect the centerline of the glide slope beam at an angle and would therefore overshoot the beam. Utilizing the signal stored in the lag filter 25 in conjunction with the vertical error signal $G_{\dot{\beta}}\beta$, the aircraft is constrained, in pitch, to merge smoothly with centerline of the beam.

As shown the accelerometer output signal $\ddot{h}$ is supplied to the filter 21. The filter 21 has a time constant of the order 20 seconds and produces, at its output, a washed out $\dot{h}$ signal which is employed in the pitch rate demand signal $q_D$, as a short period damping term.

The pitch signal generator means 11 also includes a washout filter 31 which receives a pitch attitude signal from a vertical gyro 33 and supplies a washed out pitch attitude signal $\theta$ which is employed as a long period damping term in the pitch rate demand signal $q_D$.

The gain sensitivity of the system is reduced with range from touchdown by a gain control signal $h_{R,1}$ derived from a radio altimeter 35. The signal $\beta$ from which the signal $G_{\dot\beta}\beta$ is developed is generated by an I.L.S. receiver 37. The System equations are summarized as follows:

$$-q_D = G_\beta \cdot F(h) \cdot \beta + G_{\dot\theta 2} F_{10}(S) \cdot \theta + G_{\ddot h}^{\cdot}\ddot h \left(\frac{T_3}{1+ST_3}\right)$$

$$+ (\dot h_S + k)\left(\frac{1}{1+ST_4}\right) \dot h = \dot h_{ADS}\left(\frac{1}{1+ST_2}\right)$$

$$+ (\ddot h - g)\left(\frac{T_5 S}{1+T_5 S}\right)\left(\frac{T_2}{1+T_2 S}\right)$$

$F(h) = Ah_{R,1} + \beta$

In the above equations:
$G_\beta$ is expressed in deg./sec. per deg.
$G_{\dot\theta 2}$ is expressed in deg./sec. per deg.
$G_{\dot h}$ is expressed in deg./sec. per ft./sec.
$F(h) = u$ for $h = h_1$
$F(h) = h$) $v$ for $h =$ zero
$F_{10}(S) = (20S/1+20S)$
$T_2 = 5$ sec.
$T_3 = 20$ sec.
$T_4 = 5$ sec. before capture initiation and 20 sec. after capture initiation.
$T_5 = 50$ sec.

Capture is initiated when $$|[G_{\dot h}(\dot h + k)]L| \geq |G_{\dot\beta}\beta|$$

where $L$ is a limit equal to $x$ ft./sec. and $k$ is a predetermined constant.

With the use of the embodiment of the invention described above with reference to the drawings it is found that capture of the flight path can be effected from a very wide range of approach angles. Moreover, the capture initiation commences without any abrupt signal to the pitch channel and no use is made of the air data sensor after capture initiation has commenced; it is a signal stored before capture that is employed subsequent to capture initiation. Since the air data sensor is eliminated from the controller following capture initiation the system is immune from any failure which may subsequently develop in the air data sensor.

I claim:

1. An aircraft control system including a pitch signal generator for developing a pitch signal to control the pitch channel of the aircraft, the pitch signal generator comprising means for deriving a displacement error signal which is a measure of the vertical displacement of the aircraft from a predetermined flight path; means for developing a vertical velocity signal representative of the vertical velocity of the aircraft; a logic circuit to which are applied as inputs the displacement error signal and the vertical velocity signal and which is effective to develop a capture initiation signal when the said signals are equal in magnitude, the capture initiation signal being indicative that the aircraft is at a position at which the output of the pitch signal generator may be connected to the pitch channel of the aircraft so as to cause the aircraft to capture and track the flight path, and without introducing an abrupt change in the pitch demand signal supplied to the pitch channel.

2. An aircraft control system as claimed in claim 1 wherein the means for developing the vertical velocity signal comprises an air data sensor operative to develop an air data velocity signal representative of the vertical velocity of the aircraft; and accelerometer operative to develop an accelerometer signal which is a measure of the vertical acceleration of the aircraft; and filter means for operating on and combining the accelerometer signal and the air data velocity signal to give the vertical velocity signal.

3. An aircraft control system as claimed in claim 2 wherein the filter means comprises a first lag filter and a complementary filter, the complementary filter being connected to receive the air data velocity signal and the accelerometer signal and being effective to combine these signals to provide a signal representative of the vertical velocity of the aircraft, the first lag filter being connected by connecting means to receive as its input the output from the complementary filter and being connected to apply its output to the logic circuit.

4. An aircraft control system as claimed in claim 3 wherein the said connecting means is a switch whereby, on development of the capture initiation signal the input to the first lag filter may be disconnected from the compensating filter and connected instead to earth.

5. An aircraft control system as claimed in claim 4 wherein the output of the first lag filter, which falls gradually to zero after the input to the lag filter is connected to earth, constitutes at least part of the pitch signal.

6. An aircraft control system as claimed in claim 5 wherein combining means are provided to combine the output from the first lag filter with the displacement error signal to constitute at least part of the pitch signal.

7. An aircraft control system as claimed in claim 5 wherein means are provided for deriving an output from the accelerometer and combining the derived output with the output of the first lag filter to constitute at least part of the pitch signal.

8. An aircraft control system as claimed in claim 5 wherein means are provided for developing a pitch attitude signal and combining it to constitute part of the pitch signal.

9. A aircraft control system as claimed in claim 1 wherein an integrating circuit is connected to receive an input from the accelerometer and apply its output to the logic circuit, thereby influencing the generator of the capture initiation signal by transient aircraft motion.

10. An aircraft control system as claimed in claim 1 wherein switch means are provided responsive to the capture initiation signal to effect switching of the output of the pitch signal generator to the pitch channel of the aircraft.